and Patent

[19] United States Patent
Stenger

[11] Patent Number: 5,377,244
[45] Date of Patent: Dec. 27, 1994

[54] APPARATUS AND METHOD FOR CHEMICALLY DECONTAMINATING A PWR REACTOR COOLANT SYSTEM

[75] Inventor: William J. Stenger, Penn Township, Westmoreland County, Pa.

[73] Assignee: Westinghouse Electric Corp., Pittsburgh, Pa.

[21] Appl. No.: 999,343

[22] Filed: Dec. 31, 1992

[51] Int. Cl.⁵ .............................................. G21C 9/00
[52] U.S. Cl. ................................... 376/305; 376/310; 376/313
[58] Field of Search ................ 376/305, 306, 310, 313

[56] References Cited

U.S. PATENT DOCUMENTS

| | | | |
|---|---|---|---|
| 3,783,268 | 1/1974 | Neeb et al. | 250/83.3 R |
| 4,684,494 | 8/1987 | Dagard | 376/313 |
| 4,699,755 | 10/1987 | Dagard et al. | 376/313 |
| 4,842,812 | 6/1989 | Panson et al. | 376/306 |
| 5,082,618 | 1/1992 | Dagard | 376/219 |

Primary Examiner—Donald P. Walsh
Assistant Examiner—Frederick H. Voss

[57] ABSTRACT

The reactor coolant system (RCS) of a pressurized water reactor (PWR) is chemically decontaminated and cleaned utilizing apparatus which is comprised of components designed to operate at low pressures while still utilizing installed reactor coolant pumps and/or the residual heat removal pumps to generate the high flow rates required for the process. A high volume diverted flow of reactor coolant from the RCS is passed through letdown valves to reduce the high pressure produced by the installed pumps. Chemical decontamination and cleaning agents are mixed with the low pressure diverted flow and returned to the RCS by high head injection pumps. Contamination solubilized by the decontamination and cleaning agents is removed as the reactor coolant is recirculated through demineralizers. Filters remove particulates, and fines from the demineralizer resins. A surge tank, which may or preferably is not, in the path of the diverted flow provides reactor coolant for backwashing the demineralizers and filters and downloading the demineralizer resins.

14 Claims, 3 Drawing Sheets

APPARATUS AND METHOD FOR CHEMICALLY DECONTAMINATING A PWR REACTOR COOLANT SYSTEM

BACKGROUND OF THE INVENTION

1. Field of the Invention

This invention relates to the removal of a layer of film which becomes adhered to the internal surfaces of the reactor coolant system and connected systems during operation of a pressurized water reactor (PWR). More particularly, it relates to a method and apparatus for decontaminating and cleaning the PWR reactor coolant system at a pressure which does not require high pressure components and connections.

2. Background Information

Pressurized water reactors have a reactor coolant system which circulates reactor coolant in the form of light water containing suitable levels of moderating chemicals through at least two loops which include hot leg piping between the reactor vessel and a steam generator and a cold leg returning reactor coolant from the steam generator to the reactor vessel. The reactor coolant system also includes a residual heat removal system containing heat exchangers which remove heat generated by the reactor core when the plant is shut down.

Over years of use, a two layer corrosion film forms on the typically stainless steel surfaces of the reactor coolant system. The inner layer which is a grown in place passivation film bonds to the stainless steel surface and is composed of iron, chromium, and nickel oxides. This inner layer which is several microns thick forms part of the metal surface. The outer layer of the corrosion film is a deposit of iron, cobalt nickel, and other corrosion and wear products. This film which becomes tightly adherent is activated from the passage of its constituents through the neutron flux in the reactor vessel and core. The isotopes formed in this film have long half lives such as five years or more which expose workers servicing the reactor coolant system to gamma radiation.

Most prior attempts at decontamination of PWRs have been limited to portions of the reactor coolant system, such as the steam generator channel heads and the residual heat removal system. These sections of the reactor coolant system could be chemically decontaminated with moderate flow rates at low pressure. Various processes have been developed for such chemical decontamination. Two processes are in general use. These include the LOMI process developed by the Electric Power Research Institute and the Central Electric Government Board of the United Kingdom. This process must be carried out at temperatures of about 180° F. up to about 200° F. The second system is CANDEREM developed by Atomic Energy Canada, Ltd. for heavy water carbon steel reactors. This process operates at temperatures in certain steps of up to 240° F.

In decontaminating an entire reactor coolant system of a PWR, consideration must given to the size of the system. The hot and cold leg piping can be up to for instance 31 inches in diameter. The flow rates for such a decontamination system must be great enough that the process is effective (about one foot per second minimum), and can be completed and the system flushed of the decontaminating and cleaning agents in a reasonably short time to ensure that they do not attack (corrode) the walls of the reactor coolant system. The high flow rates required can best be achieved by circulating the reactor coolant with the decontamination and cleaning agents using the installed main reactor coolant pumps and/or the residual heat removal pumps to provide flow through the reactor coolant system and temperature control for the decontamination process. However, the minimum pressure required for operation of these installed pumps is usually fairly high, 400 psig or higher, and therefore, the decontamination system and its components must be designed to withstand such pressures. In fact, the pressure at the discharge side of the residual heat removal system pumps can be 570 psig or higher. Therefore, a decontamination system utilizing these pumps must be designed to withstand a pressure of 600 psig or higher. As it is noted above, the temperatures required for these chemical decontamination and cleaning processes can also be up to 240° F. Therefore, the components of the decontamination system must be designed to withstand both high pressures and high temperatures. Vessels and conduits designed for these pressures and temperatures can have wall thicknesses of several inches. Thus, the components must be specially adapted, and welded connections and piping rather than flexible conduits are required.

There is a need for an improved method and apparatus for chemically decontaminating and cleaning the full reactor coolant system of a PWR which operates at pressures which permit the use of standard system components including couplings in place of welded connections.

There is also a need for such an improved method and apparatus which provides the required flow rate for the process while using standard components.

There is a further need for such a method and apparatus which can operate at the elevated temperatures required by the chemical decontamination and cleaning processes.

SUMMARY OF THE INVENTION

These and other needs are satisfied by the invention which is directed to a method and apparatus for chemically decontaminating and cleaning the reactor coolant system (RCS) of a pressurized water reactor utilizing the installed pumps yet requiring only standard components designed to operate at pressures no greater than about 150 psig. More particularly, a flow rate of at least about 1000 gallons per minute of reactor coolant and preferably about 1500 gallons per minute, is diverted from the reactor coolant system by downlet means which reduces the pressure of the diverted flow to pressures not greater than about 150 psi, and preferably about 20–30 psi. The diverted flow of reactor coolant at reduced pressure is mixed with chemical decontamination and cleaning agents and is injected back into the reactor coolant system by high head injection pumps. The mixture of reactor coolant and chemical decontamination and cleaning agents circulates through the reactor coolant system where it solubilizes the film adhering to the walls of the system. These solubilized contaminates, and also particulate contaminates, are removed from the diverted flow of reactor coolant by decontamination means upstream of the point where the decontamination and cleaning agents are added to the diverted flow. This decontamination means includes demineralizers which remove the solubilized contaminates, and filters which remove the particulate contamination. A portion of the diverted flow can be retained in a surge tank, and used as needed to backwash the demineralizer and/or the filters. In one embodiment of the invention, all of the diverted flow of reactor coolant is introduced into the surge tank and flow pumps pump reactor coolant from the surge tank through the demineralizers. In the preferred embodiment of the invention, the surge tank is not in the direct path of the diverted flow. Instead, the diverted flow is circulated utilizing only the installed pumps in the RCS and the high head injection pumps.

With the invention, conventional demineralizers, filters, surge tanks and connecting conduits can be of standard designs which operate at 150 psi or lower. Such equipment is less expensive and lighter for easier temporary installation and removal. Also, it is easier and less costly to generate the capacity needed by adding additional demineralizers or filters.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
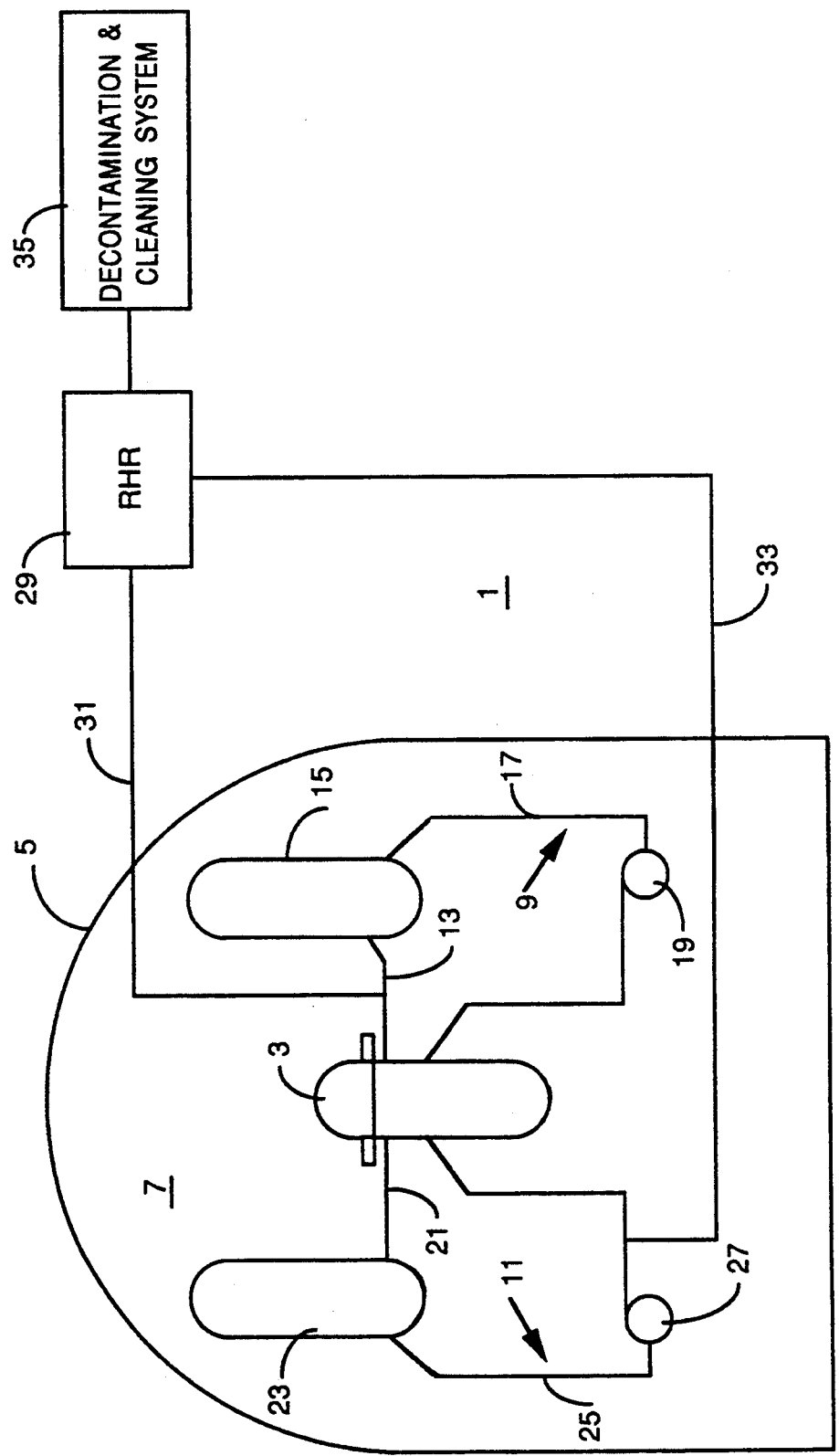
FIG. 1 is a schematic illustration of a two-loop pressurized water reactor (PWR) incorporating the invention.

FIG. 1 illustrates a PWR 1 which includes a reactor vessel 3 housed inside of containment 5. The reactor coolant system 7 of the PWR 1 illustrated includes two loops 9 and 11. The first loop 9 includes a hot leg 13 which delivers reactor coolant from the reactor vessel 3 to a steam generator 15. The reactor coolant is then circulated back to the reactor vessel through a cold leg 17 by a main reactor coolant pump 19. Similarly, the second loop 11 has a hot leg 21 delivering reactor coolant to the steam generator 23, and a cold leg 25 through which the coolant is returned to the reactor vessel by main coolant pump 27. The steam generators 15 and 23 utilize the heat transported by the reactor coolant to generate steam which drives a steam turbine and coupled electrical generator in a secondary loop (not shown) to produce electricity.

When the reactor is shut down, a residual heat removal system (RHR) 29 draws reactor coolant from one of the hot legs such as 13, passes it through a heat exchanger and returns the coolant to the cold leg, such as 25, of the other loop of the reactor coolant system. In accordance with the invention, a decontamination and cleaning system 35 diverts reactor coolant from the RHR 29 for decontamination and cleaning. While a two-loop PWR 1 has been shown for simplicity, it should be understood that the invention is equally applicable to PWRs with other numbers of loops, such as typically three or four.

Figure 2:
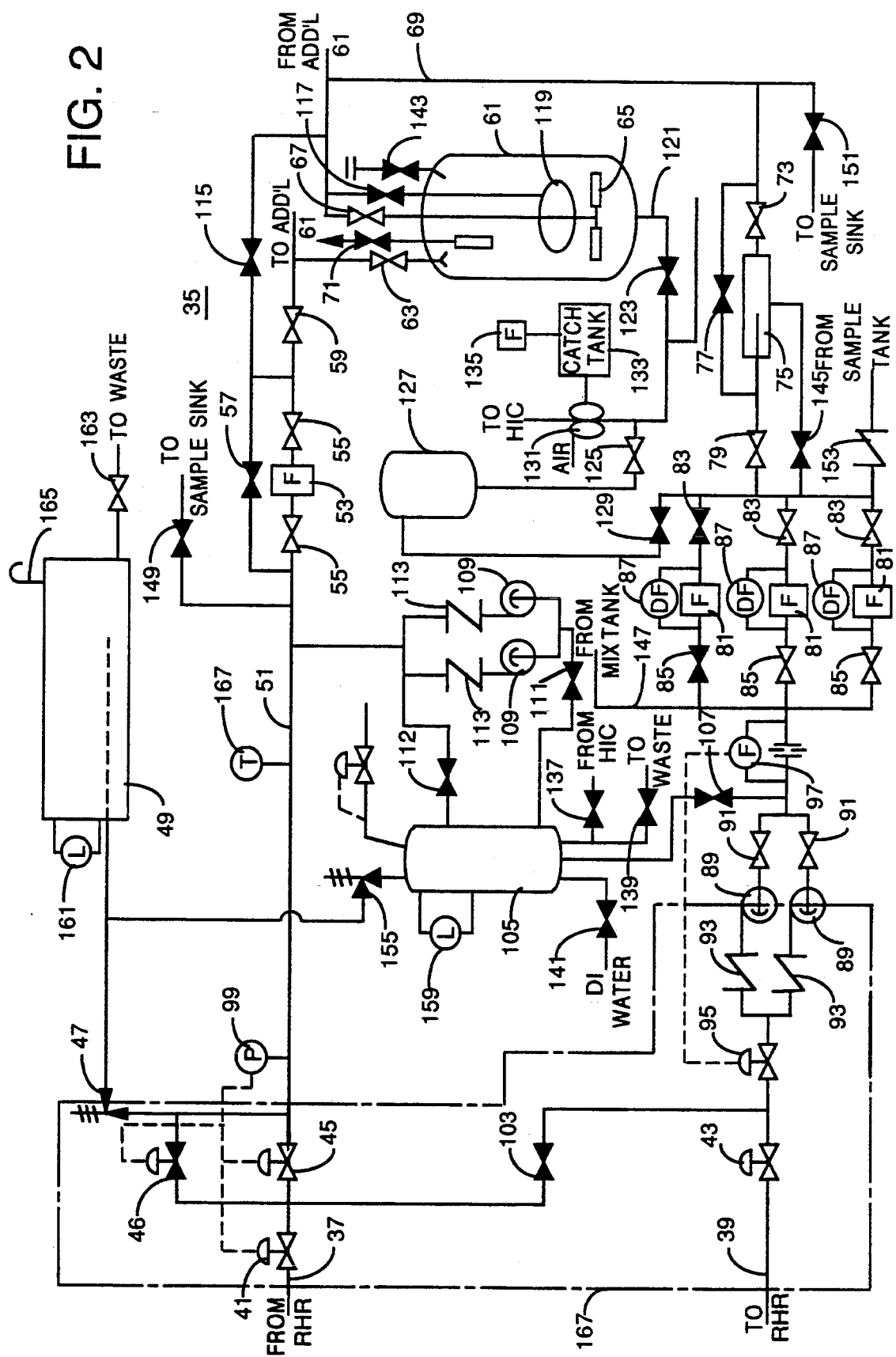
FIG. 2 is a schematic diagram of one embodiment of the decontamination and cleaning system of the invention.

FIG. 2 illustrates the decontamination and cleaning system 35. This system 35 is connected to the residual heat removal system by a conduit 37, and returns reactor coolant to the residual heat removal system through conduit 39. The system 35 can be isolated from the reactor coolant system 7 by motor or air operated, fail closed, isolation valves 41 and 43. A flow of reactor coolant is diverted from the reactor coolant system 7 through the conduit 37. This flow of diverted reactor coolant is by way of example at a pressure of 400-570 psig and can be up to 240° F. in temperature. The diverted flow rate is at least 1000 gallons per minute, and more likely in the range of 1200 to 1500 gallons per minute. In the exemplary system, 1500 gallons per minute of reactor coolant is diverted. An air operated, fail closed, letdown valve 45 reduces the pressure of the diverted flow of reactor coolant to below 150 psi, and typically to about 20-30 psi. Valve 46 is a second letdown valve (installed spare) to be used in the event of failure of valve 45. A relief valve 47 protects the low pressure portion of the system in the event of a failure of the letdown valve 45. Dissolved gases released by the reduction in pressure may also be vented by way of this valve to a relief discharge/quench tank 49.

The diverted flow of reactor coolant is delivered through a conduit 51 at reduced pressure to a filter 53 which removes particulate contaminates. This filter 53 can be isolated by valves 55 and bypassed by valve 57. Throughout FIG. 2 and FIG. 3, valves shown in outline such as 55 are normally open, and those shown solid such as 57 would normally be closed. The filtered coolant is then passed through another isolation valve 59 to a number of demineralizers 61 (only one shown) each with its own inlet valve 63. Typically for the LOMI process, a total of about 18 demineralizers 61 are required, while 15 would typically be required for the CANDEREM process. The demineralizers 61 have retention elements 65 holding resins (not shown) which remove the solubilized contaminants from the diverted flow of reactor coolant by ion exchange. The reactor coolant flows out of the demineralizers through outlet valves 67 into a common conduit 69. Gases are vented from the demineralizer 61 through vents 71.

Reactor coolant from the demineralizers 61 is delivered by the conduit 69 through an inlet valve 73 to a resin trap 75 which captures resin carried by the reactor coolant from the demineralizers due to a failure of a retention element 65. The resin trap 75 can be bypassed by a bypass valve 77.

Reactor coolant passes from the resin trap 75 through an outlet valve 79 to a set of parallel filters 81, each having an inlet valve 83 and an outlet valve 85, which remove resin fines. Each of these resin fines filters 81 can accommodate 50% of full decontamination system flow, so that only two need be in service at any one time, and the third can be on standby or out of service for cleaning. Differential pressure sensors 87 across the resin fines filters 81 provide an indication of when the filters need to be taken out of service for cleaning. The chemically decontaminated and filtered reactor coolant is then returned to the RCS 7 by a pair of high head injection pumps 89. Each of the pumps 89 has an inlet valve 91 on the suction side, and a check valve 93 on the discharge side. The rate of flow of the diverted reactor coolant is regulated by a control valve 95 controlled by a flow meter 97. Either of the pumps 89 can handle 100% of the decontamination system flow.

The pressure of the diverted flow of reactor coolant in the decontamination and cleaning system 35 is regulated to the pressure sensed by a pressure transducer 99. Flow is bypassed around the decontamination and cleaning system 35 through valve 103.

A surge tank 105 is connected to the suction side of the high head injection pumps 89 through a valve 107 and maintains a net positive suction head for the pumps 89. The reactor coolant stored in the surge tank 105 is also used to flush resin out of the demineralizers 61. A pair of sluice pumps 109, each with an inlet valve 111 and check valve 113, pump reactor coolant from the surge tank 105 through filter bypass valve 57, valve 115 and individual flush valves 117 to a spray ring 119 to flush the resin through a bottom outlet 121.

Resin flushed from the demineralizers 21 passes through discharge valves 123 and valve 125 to a resin collection tank 127. Excess reactor coolant from the resin collection tank 127 passes through the valve 129 to the resin fine filters before returning to the surge tank through the valve 107. The partially dewatered resin remaining in the resin collection tank 127 is transferred by an air operated pump 131 to a high integrity container system (HIC) (not shown) for disposal. In the event that the diaphragm of the air operated pump 131 should rupture, a catch tank 133 is provided to collect any resin discharged. A high efficiency particulate air (HEPA) filter 135 removes any fines from discharged air. The HIC contains dewatering equipment which removes additional reactor coolant used to transfer the resin from the resin collection tank 127 to the HIC. This additional reactor coolant is returned to the surge tank 105 through valve 137. When required, the surge tank 105 can be discharged through 139 to waste. Makeup water for the surge tank 105 can be added through the valve 141.

The demineralizers 61 can be recharged with resin through the flanged valves 143. The resin trap 75 can be backwashed by coolant pumped by the sluice pumps 109 from the surge tank 105 around the filter 53 through valve 57, and around the demineralizers 61 through the valve 115. During backwash, the valves 73 and 79 are closed, and the valves 77 and 145 are open. The backwash passes through the resin fines filter 81 and is returned to the surge tank through the valve 107, or to the resin collection tank 127 via valve 129.

The chemicals for performing the decontamination and cleaning are prepared in a mix tank (not shown), and added to the decontamination and cleaning system 35 through the line 147 on the suction side of the high head pumps 109. Samples of the reactor coolant can be taken during the decontamination and cleaning process from the line 51 through valve 149 and from the line 69 through the valve 151. These samples are analyzed in a lab and then returned to the decontamination cleaning system 35 through the check valve 153. By comparing the samples extracted from the lines 51 and 69, the effectiveness of the demineralizers can be assessed. The surge tank 105 is vented to the relief discharge/quench tank 49 through a relief valve 155. If desired, the surge tank 105 can be pressurized with nitrogen gas through regulator valve 157. The level of reactor coolant in the surge tank 105 is monitored by the level sensor 159. A similar level sensor 161 monitors the liquid level in the relief discharge/quench tank 49. The contents of this tank 49 are discharged to waste through valve 163 and cleaned gases are released through vent 165.

In the decontamination and cleaning system 35 shown in FIG. 2, only the components shown within the dashed line 167 which interconnect with the RCS system 7 operate at high pressure. In the exemplary system 35, these components are designed to withstand 600 psi. All of the remaining components of the decontamination and cleaning system 35 outside the box 167 shown in FIG. 2 operate at low pressure, which in the exemplary system is about 20 to 30 psi. Hence, low pressure components such as conventional components designed to operate up to 150 psi may be used. Thus, it is practical to provide enough demineralizers 61 in parallel such that the RCS 7 can be decontaminated on one charge of resin, and thus, there is no time lost for downloading and reloading the demineralizers during the decontamination and cleaning process. Also, since all of the components outside of the block 167 operate at low pressure, flexible conduits with quick disconnect type couplings can be used in place of welded pipe. The components designed to operate at low pressure are not only less costly, but are lighter and easier to move into place and remove for the decontamination and cleaning process.

Figure 3:
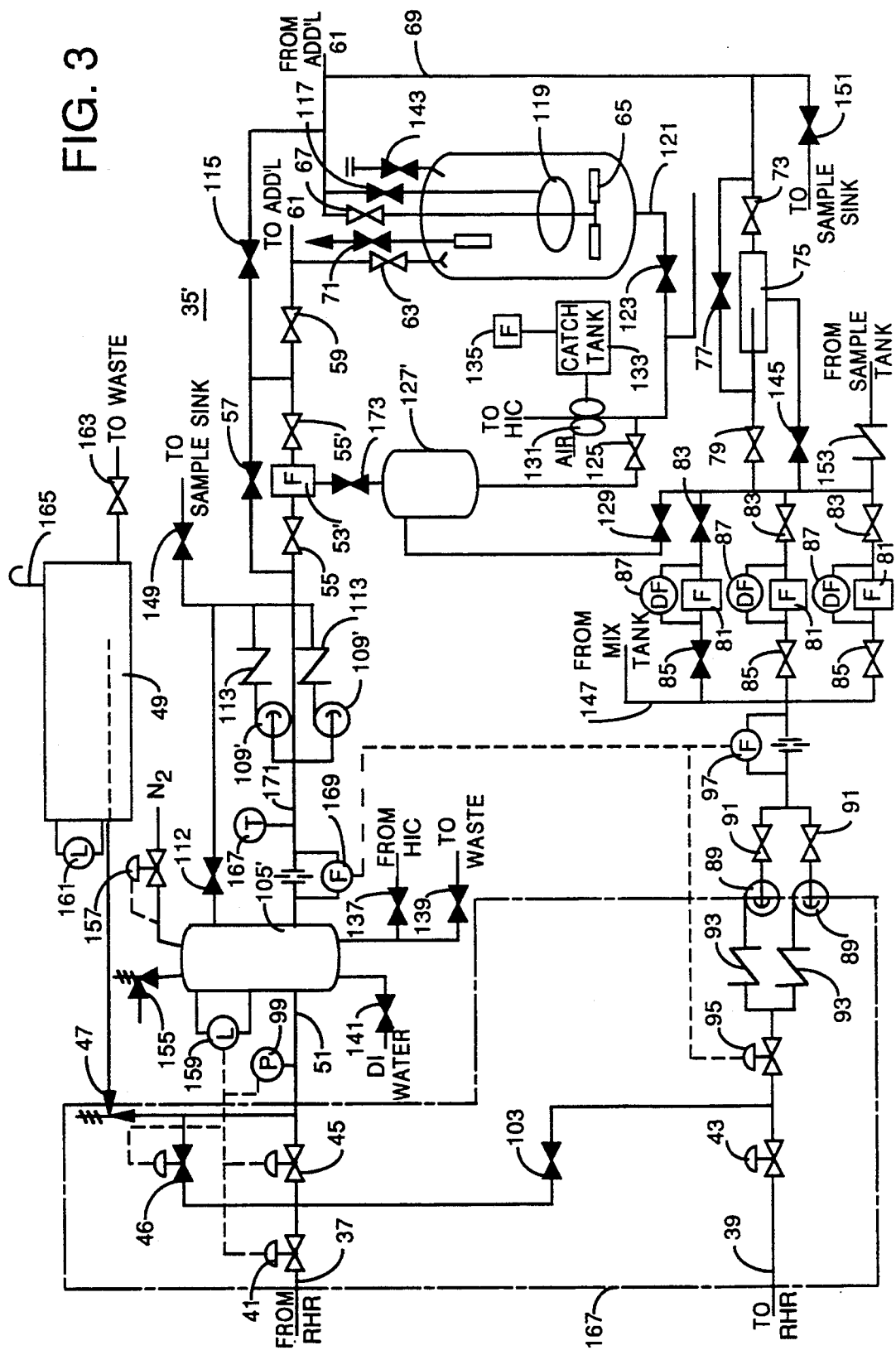
FIG. 3 is a schematic diagram of another embodiment of the decontamination and cleaning system in accordance with the invention.

FIG. 3 illustrates another embodiment of the decontamination and cleaning system designated as 35'. Components in this embodiment which are the same as the components in the embodiment illustrated in FIG. 2 are identified by like reference characters. Those components which are similar to corresponding components in the preferred embodiment are shown with primed reference characters. The fundamental difference in this embodiment of the invention is that the surge tank 105' is in the direct flow path of the diverted reactor coolant. Thus, the conduit 51 from the letdown valve 45 introduces the reactor coolant diverted from the RCS 7 into the surge tank 105'. The pumps 109' then provide flow from the surge tank 105' to the demineralizers 61 through the filter 53'. A second flow meter in the conduit 171 between the surge tank 105' and the pumps 109' provides control signals which are used along with control signals generated by the flow meter 97 for controlling the flow control valve 95.

As in the case of the embodiment shown in FIG. 2, the flow pumps 109' in the embodiment of FIG. 3 also serve as sluice pumps to pump reactor coolant from the surge tank 105' through the spray ring 119 and the demineralizers 61 for backwashing in the demineralizers, and for downloading the resin from the demineralizers 61 to the tank 127'. However, in the embodiment of FIG. 3, the reactor coolant used for backwashing and downloading the demineralizers 61 is not returned to the surge tank 105'.

In the embodiment of FIG. 3, the filter 53' is a backwash filter. Reactor coolant from the surge tank 105' can be pumped by the flow/sluice pumps 109' through the valves 57 and 55 to backwash the filter 53'. The backwash is sent to the tank 127' through valve 173. Thus, the tank 127' serves as a filtrate, as well as a resin collection tank, and therefore must be larger than the tank 127. Typically, the volume of the filtrate/resin collection tank 127' would be about four times the volume of the filter 53'.

Again, all of the components of the embodiment shown in FIG. 3 outside of the box 167 are low pressure components typically operating at 20 to 30 psi so that standard components which typically are designed to withstand up to about 150 psi can be used.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. Apparatus for chemically decontaminating a reactor coolant system of a pressurized water reactor having installed pumps circulating reactor coolant at a pressure of at least 400 psi, said apparatus comprising:
   downlet means connected to said reactor coolant system diverting, at a pressure no greater than about 150 psi, a flow of at least about 1000 gallons per minute of reactor coolant circulated by said installed pumps;
   means for mixing chemical decontaminating and cleaning agents with said diverted flow of reactor coolant;
   contaminant removal means upstream of said mixing means removing contaminants from said diverted flow of reactor coolant including contaminants solubilized by said chemical cleaning and decontaminating agents; and
   high head injection pump means for injecting said diverted flow of reactor coolant back into said reactor coolant system at a pressure of at least about 400 psi.

2. The apparatus of claim 1 wherein said downlet means diverts a flow of reactor coolant from said reactor coolant system at a flow rate of about 1200 to 1500 gallons per minute.

3. The apparatus of claim 2 wherein said downlet means diverts a flow of reactor coolant from said reactor coolant system at a flow rate of about 1500 gallons per minute.

4. The apparatus of claim 1 wherein said downlet means diverts said flow of reactor coolant at a pressure of about 20 to 30 psi.

5. The apparatus of claim 1 wherein said contaminant removal means comprises demineralizer means containing resins which remove contaminants solubilized in said reactor coolant by said chemical cleaning and decontaminating agents.

6. The apparatus of claim 5 wherein said contaminant removal means includes filters removing particulate matter from said diverted flow of reactor coolant.

7. The apparatus of claim 6 including surge tank means in which a supply of said diverted flow of reactor coolant is retained, and further including means selectively backwashing said demineralizer means with retained reactor coolant from said surge tank means.

8. The apparatus of claim 7 wherein said surge tank means includes gas vent means venting dissolved gases from said reactor coolant.

9. The apparatus of claim 7 including surge tank means receiving all flow from said downlet means, and including flow pumps pumping reactor coolant from said surge tank means to said demineralizer means.

10. The apparatus of claim 9 including means selectively directing flow from said flow pump means to backwash said demineralizer means with reactor coolant from said surge tank means.

11. A method of chemically decontaminating a reactor coolant system in a pressurized water reactor, said method comprising the steps of
   circulating reactor coolant through said reactor coolant system using installed pumps;
   diverting a flow of about at least 1000 gallons per minute from said reactor coolant system;
   reducing pressure of the diverted flow of reactor coolant to not greater than about 150 psi;
   passing said diverted flow of reactor coolant through demineralizer and filter means;
   adding chemical decontaminating and cleaning agents to said diverted flow of reactor coolant; and
   injecting said diverted flow of reactor coolant with said chemical decontaminating and cleaning agents back into said reactor coolant system.

12. The method of claim 11 wherein said reactor coolant system includes at least two loops, each having a hot leg and a cold leg, and a residual heat removal system drawing reactor coolant from a hot leg of one loop and returning it to the cold leg of the other loop, and wherein said step of diverting a flow of about at least 1000 gallons per minute from said reactor coolant system comprises diverting said flow from said residual heat removal system, and wherein said step of injecting said diverted flow back into said reactor coolant system comprises injection into said residual heat removal system.

13. The method of claim 10 including the step of venting gas from diverted flow of reactor coolant at said pressure of not greater than about 150 psi.

14. The method of claim 11 including retaining a supply of diverted reactor coolant and selectively backwashing said demineralizer means therewith.

* * * * *